United States Patent
Lin et al.

(10) Patent No.: US 7,263,041 B2
(45) Date of Patent: Aug. 28, 2007

(54) METHOD FOR MEASURING A TILT CONTROL VALUE OF A PICKUP HEAD IN AN OPTICAL DISK DRIVE

(75) Inventors: Jia-Hao Lin, Wu Jih Hsiang (TW); Chih-Hsien Kao, Hsin Chu (TW); Hsu-Feng Ho, Tai Pei (TW); Shih-Hao Ke, Ta Li (TW)

(73) Assignee: Mediatek Inc., Hsin Chu (TW)

( * ) Notice: Subject to any disclaimer, the term of this patent is extended or adjusted under 35 U.S.C. 154(b) by 526 days.

(21) Appl. No.: 10/914,097

(22) Filed: Aug. 10, 2004

(65) Prior Publication Data

US 2005/0036419 A1    Feb. 17, 2005

(30) Foreign Application Priority Data

Aug. 11, 2003  (TW) .............................. 92122032 A

(51) Int. Cl.
*G11B 7/00* (2006.01)
(52) U.S. Cl. ................................ 369/44.32; 369/53.19
(58) Field of Classification Search ............ 369/44.32, 369/53.19, 53.24
See application file for complete search history.

(56) References Cited

U.S. PATENT DOCUMENTS

| 5,001,690 A | 3/1991 | Kamiya et al. |
| 6,137,754 A | 10/2000 | Furukawa et al. |
| 6,442,112 B1 * | 8/2002 | Tateishi .................. 369/44.32 |

\* cited by examiner

*Primary Examiner*—Nabil Hindi
(74) *Attorney, Agent, or Firm*—Birch, Stewart, Kolasch & Birch, LLP

(57) ABSTRACT

A method for measuring a tilt angle of a pickup head. The method includes the steps of: moving the pickup head to a track to be measured; radiating a laser beam with a constant power; defining a proper range of tilt control values; controlling the tilt angle of the pickup head according to the range of tilt control values, acquiring a RF signal corresponding to each tilt control value, and storing an associated value of a associated signal; detecting the maximum among the stored associated values; selecting and storing the tilt control value corresponding to the maximum as the optimum tilt control value for the track if there is a maximum; and modifying the range of tilt control values and executing the previous steps if there is no maximum. The so-called associated signal includes a tracking error signal, a reading/writing RF signal, an S-curve signal, or the RF signal.

7 Claims, 5 Drawing Sheets

METHOD FOR MEASURING A TILT CONTROL VALUE OF A PICKUP HEAD IN AN OPTICAL DISK DRIVE

This application claims the benefit of the filing date of Taiwan Application Ser. No. 092122032, filed on Aug. 11, 2003, the content of which is incorporated herein by reference.

BACKGROUND

The invention relates to a method for measuring a tilt control value of a pickup head in an optical disk drive, and more particularly to a method for measuring a tilt control value of a pickup head by using signals, such as a tracking error (TE) signal, a radio frequency ripple (RF ripple, RFRP) signal, a S-curve signal, or an RF signal, which are derived from the reproduction signal of the pickup head.

A pickup head (Optical Pickup Head) in an optical recording and reproducing device needs one actuator to adjust the positions and angles of the object lens of the pickup head to enable the optical device to read or write information, such as EFM (Eight to Fourteen Modulation) signal, in a robuster manner. The actuator can precisely move the object lens to the desired position (angle). However, when the to-be-read or to-be-written optical disk is curved, or the tilt angle of the pickup head is incorrect, the read or written information may be deteriorated. In order to compensate for this information deterioration, the relative tilt angle between the pickup head and the optical disk has to be measured and the tilt angle of the pickup head has to be adjusted timely.

FIG. 1 shows the architecture of a typical tilt measuring device. As shown in this drawing, the typical tilt measuring device includes a pickup head 10, a tilt detector 13, and an object lens 16. The pickup head 10 is pivoted upon a rotating shaft 18 and rotated under the control of an actuator (not shown). The tilt detector 13 utilizes a light emitter 12 to emit light rays and utilizes optical receivers 14a and 14b to receive the reflected light rays. Thus, the tilt value may be measured according to the signals of the optical receivers 14a and 14b and the actuator is controlled according to the tilt value. This method directly utilizes the relative tilt angle between the pickup head and the optical disk to adjust the tilt angle of the pickup head.

FIG. 2 shows a method for measuring the tilt angle of the pickup head without using a displacement detector. As shown in this drawing, the tilt control module 20 includes a reproduction signal generator 22, a jitter detector 23, a tilt control unit 24, a tilt actuator 25, and a memory 26. The reproduction signal generator 22 is used for converting the RF signal generated by the pickup head into the EFM (Eight to Fourteen Modulation) signal. The reproduction signal generator 22 may be a slicer to slice the RF signal into the signal with level 0 or 1. The jitter detector 23 receives the EFM signal and detects the jitter amount of the EFM signal. The typical jitter amount is obtained by calculating the wandering level of the EFM signal. The tilt control unit 24 outputs different tilt values corresponding to different pickup head's tilt values, records the corresponding jitter amounts, and selects the tilt value with minimum jitter amount or the tilt value with jitter amount smaller than a threshold, as the optimum tilt control value for the track. The tilt actuator 25 outputs a drive signal to the optical module 21 to adjust the pickup head's tilt angle according to the tilt control value of the tilt control unit 24. The tilt control value may be a digital signal and stored in the memory 26. In addition, the tilt control value is converted by a digital/analog converter (DAC) and then outputted to the tilt actuator 25. The tilt actuator 25 converts the signal, such as the voltage signal ranging from 0 to 4V, corresponding to the tilt control value into the drive signal for driving the pickup head to rotate.

The above method can adjust the pickup head's tilt angle to the preferred position without using a displacement detector. However, only the optical disk with data can be utilized to calculate the jitter amount of the EFM signal, so as to adjust the pickup head's tilt angle. Thus, the tilt control value for the blank optical disk cannot be adjusted because the EFM signal cannot be obtained.

SUMMARY

In view of the above-mentioned problems, an object of the invention is to provide a method for measuring a tilt control value of a pickup head without using a displacement detector, wherein the method is adapted to both the blank optical disk and the disk with data.

To achieve the above-mentioned object, the invention provides a method for measuring a tilt control value of a pickup head. The method includes the steps of: moving the pickup head to a track to be measured; radiating a laser beam with a constant power; defining a set of tilt values; controlling the tilt angle of the pickup head according to the set of tilt values, acquiring an RF signal corresponding to each tilt value, and storing an associated value of an associated signal for each tilt value according to the RF signal; detecting the maximum value among the stored associated values; storing the tilt control value corresponding to the maximum as the tilt control value for the track if there is a maximum value; and modifying the set of the tilt values and executing the previous steps if there is no maximum value.

The so-called associated signal includes the tracking error signal, the reading/writing RF signal, the S-curve, or the RF signal.

DETAILED DESCRIPTION

The method for measuring the tilt angle of the pickup head of the present invention will be described with reference to the accompanying drawings. In general, when the power of the laser beam is constant, if there is no tilt angle between the pickup head and the optical disk (i.e., the angle therebetween is 90 degrees), the RF signal reproduced from the optical disk has a maximum value because the reflective amount of the laser beam is the maximum. The associated signal derived from the RF signal is also the maximum. The invention measures the tilt control value of the pickup head according to this property. The associated signals include, without limitation to, a tracking error signal, a reading/writing RF signal, an S-curve signal, and a RF signal.

Figure 1:
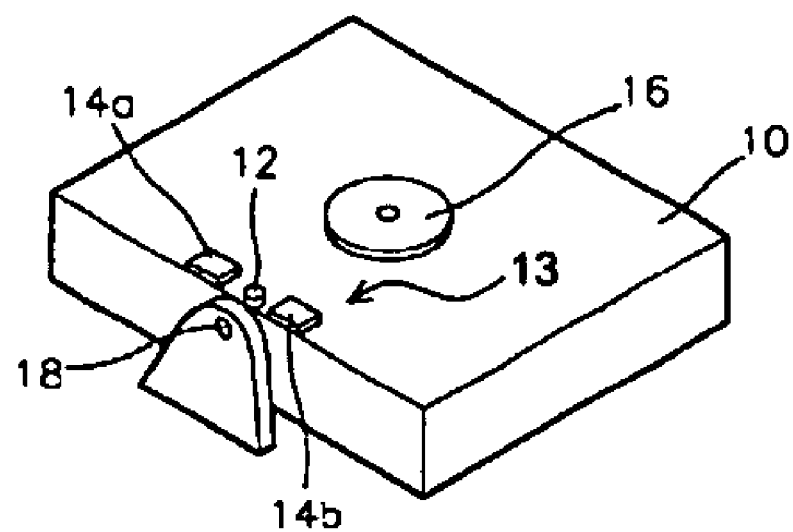
FIG. 1 shows the architecture of a typical tilt measuring device.
Figure 2:
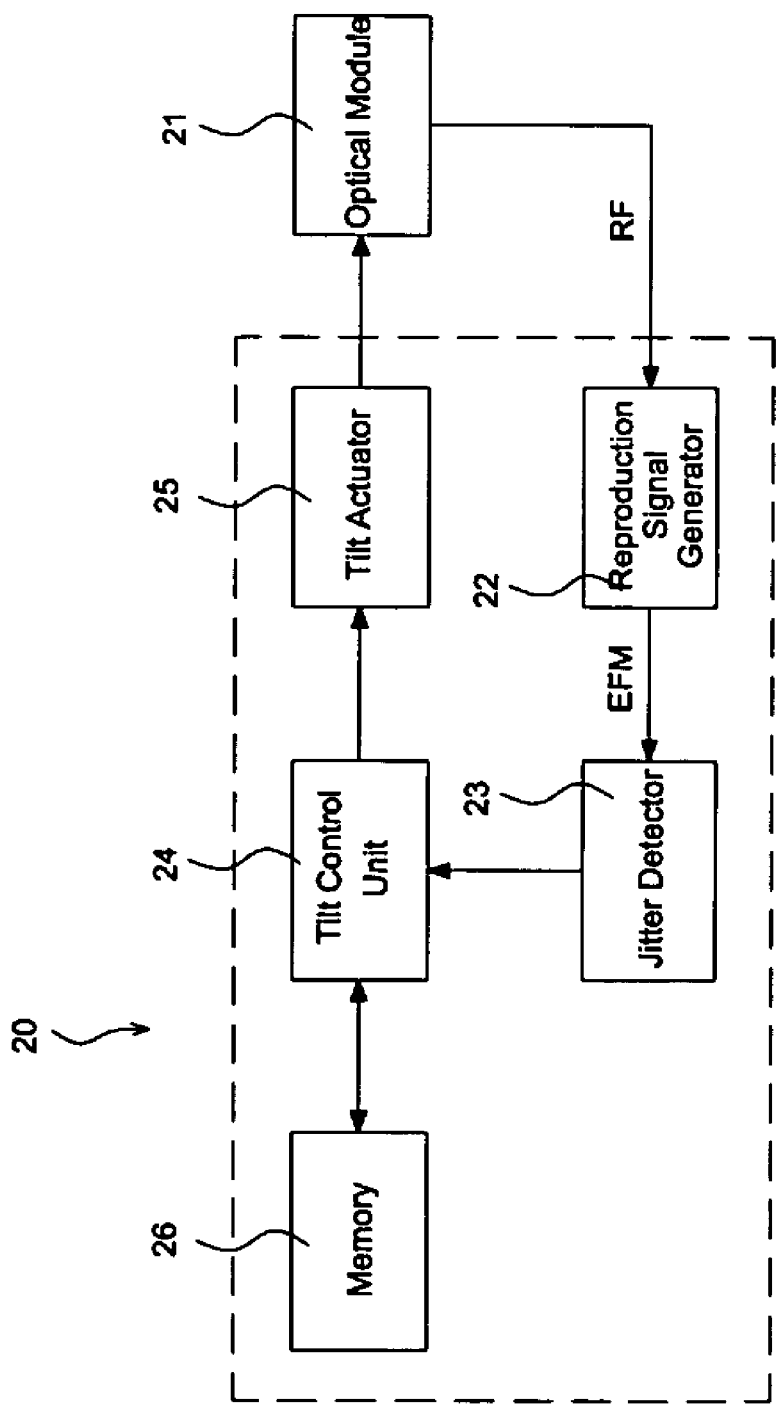
FIG. 2 shows the architecture of an optical device for measuring the tilt angle of the pickup head.
Figure 3:
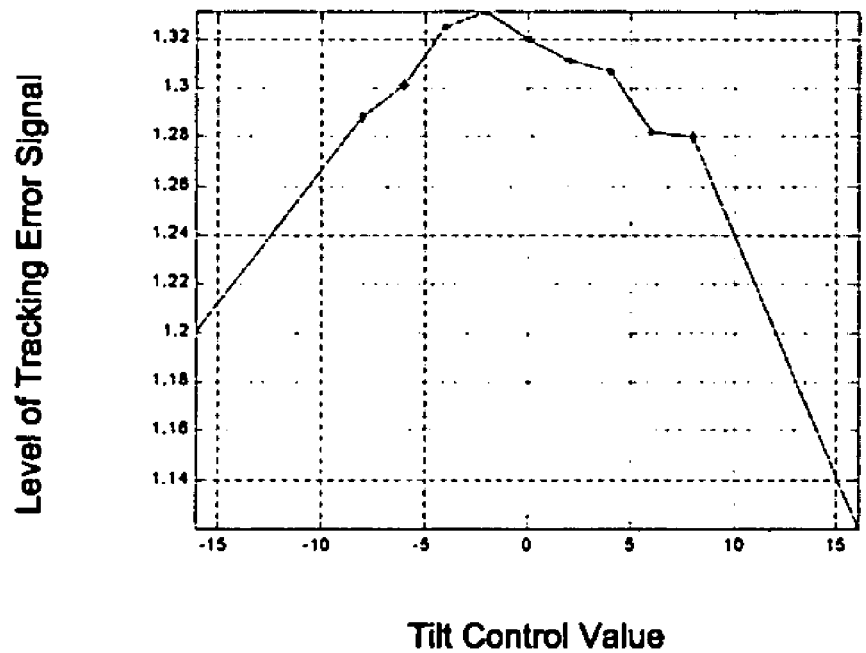
FIG. 3 shows the relationship between the tilt control value and the level of tracking error signal, wherein the horizontal axis represents the tilt control value and the vertical axis represents the level of tracking error signal.

FIG. 3 shows the relationship between the tilt control value and the level of a tracking error signal, wherein the horizontal axis represents the tilt control value and the vertical axis represents the level of the tracking error signal. The tilt control value is typically a digital signal. For example, the range of the tilt control value of FIG. 3 is from −16 to 16. A DAC (not shown) converts the tilt control value into an analog signal, which is then provided to a tilt actuator (not shown) to control the tilt angle of the pickup head. As shown in FIG. 3, under the same environment, for example, when the power of the laser beam is constant, the level of tracking error signal is changed with the change of the tilt control value. When the level of tracking error signal is the maximum, it represents that the tilt control value at this time causes no tilt angle between the pickup head and the optical disk. Consequently, as long as a proper range of the tilt control value is defined and the corresponding level of the tracking error signal within this range of tilt control value is obtained, the tilt control value corresponding to the maximum level of the tracking error signal is selected as the optimum tilt control value for this track.

Figure 4:
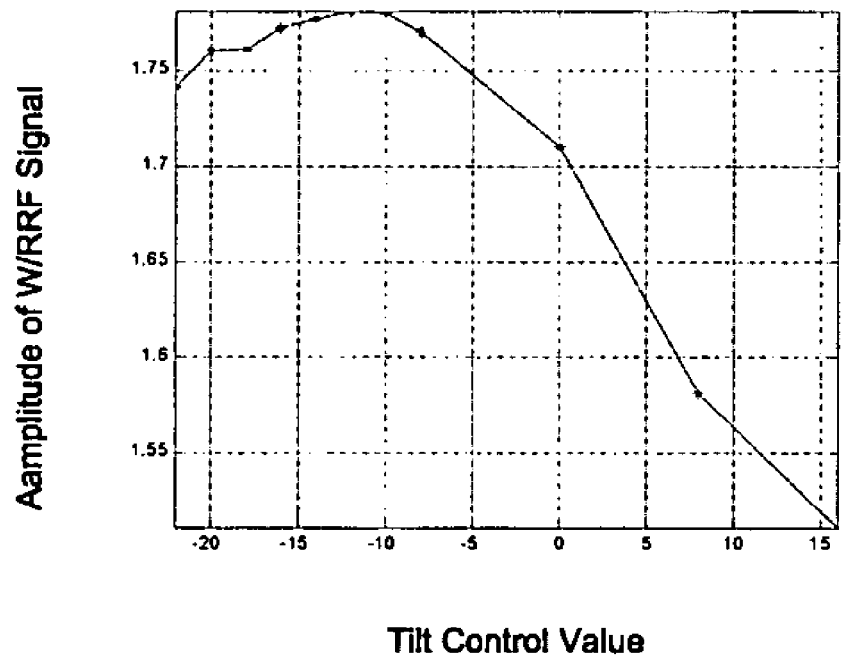
FIG. 4 shows the relationship between the tilt control value and the amplitude of the writing/reading RF signal, wherein the horizontal axis represents the tilt control value and the vertical axis represents the amplitude of the writing/reading RF signal.

FIG. 4 shows the relationship between the tilt control value and the amplitude of writing/reading RF (W/RRF) signal, wherein the horizontal axis represents the tilt control value and the vertical axis represents the amplitude of the W/RRF signal. The tilt control value is typically a digital signal. For example, the range of the tilt control value of FIG. 4 is from −22 to 16. A DAC (not shown) converts the tilt control value into an analog signal, which is then provided to a tilt actuator (not shown) to control the pickup head's tilt angle. As shown in FIG. 4, under the same environment, for example, when the power of the laser beam is constant, the amplitude of the W/RRF signal is changed with the change of the tilt control value. When the amplitude of the W/RRF signal is the maximum, it represents that the tilt control value at this time causes no tilt angle between the pickup head and the optical disk. Consequently, as long as the range of the tilt control value is defined and the corresponding amplitude of the W/RRF signal within this range of the tilt control value is obtained, the tilt control value corresponding to the maximum amplitude of the W/RRF signal is selected as the optimum tilt control value for this track.

Figure 5:
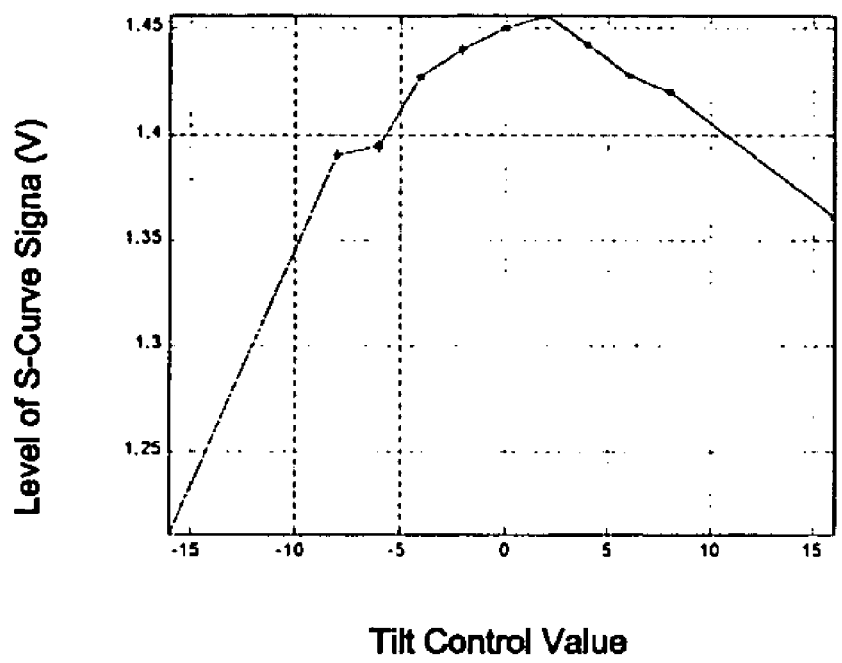
FIG. 5 shows the relationship between the tilt control value and the level of the S-curve signal, wherein the horizontal axis represents the tilt control value and the vertical axis represents the level of the S-curve signal.

FIG. 5 shows the relationship between the tilt control value and the level of the S-curve signal, wherein the horizontal axis represents the tilt control value and the vertical axis represents the level of the S-curve signal. The tilt control value is typically a digital signal. For example, the range of the tilt control value of FIG. 5 is from −16 to 16. A DAC converts the tilt control value into an analog signal, which is then provided to a tilt actuator (not shown) to control the tilt angle of the pickup head. As shown in FIG. 5, under the same environment, for example, when the power of the laser beam is constant, the level of the S-curve signal is changed with the change of the tilt control value. When the level of the S-curve signal is the maximum, it represents that the tilt control value at this time causes no tilt angle between the pickup head and the optical disk. Consequently, as long as the proper range of the tilt control value is defined and the corresponding level of the S-curve signal within this range of the tilt control value is obtained, the tilt control value corresponding to the maximum S-curve level is selected as the optimum tilt control value for this track.

Figure 6:
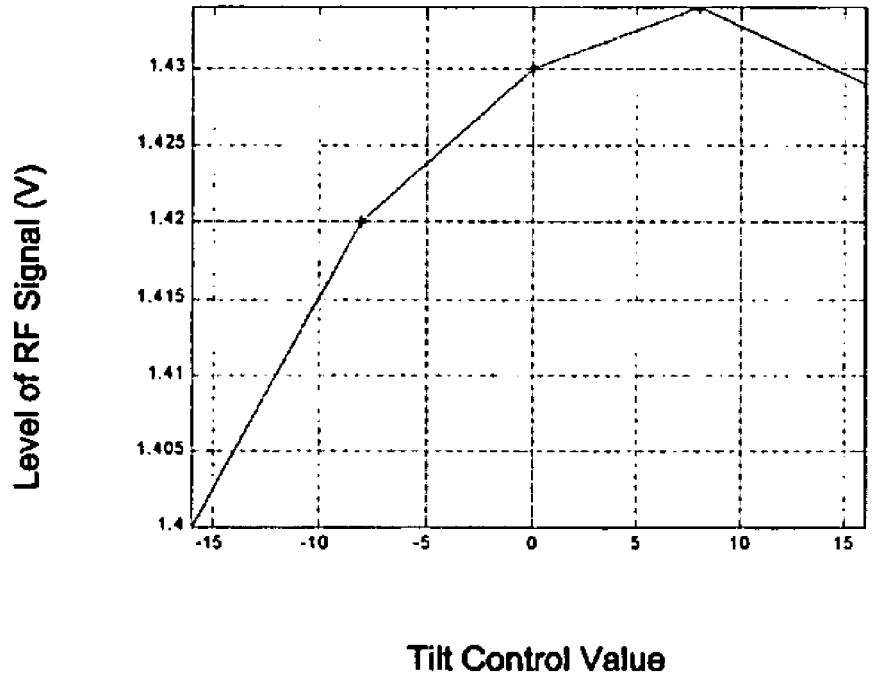
FIG. 6 shows the relationship between the tilt control value and the level of the RF signal, wherein the horizontal axis represents the tilt control value and the vertical axis represents the level of the RF signal.

FIG. 6 shows the relationship between the tilt control value and the level of the RF signal, wherein the horizontal axis represents the tilt control value and the vertical axis represents the level of the RF signal. The tilt control value is typically a digital signal. For example, the range of the tilt control value of FIG. 6 is from −16 to 16. A DAC converts the tilt control value into an analog signal, which is then provided to a tilt actuator (not shown) to control the tilt angle of the pickup head. As shown in FIG. 6, under the same environment, for example, when the power of the laser beam is constant, the level of RF signal is changed with the change of the tilt control value. When the level of the RF signal is the maximum, it represents that the tilt control value at this time causes no tilt angle between the pickup head and the optical disk. Consequently, as long as the proper range of the tilt control value is defined and the corresponding level of the RF signal within this range of the tilt control value is obtained, the tilt control value corresponding to the maximum level of the RF signal is selected as the optimum tilt control value for this track.

Figure 7:
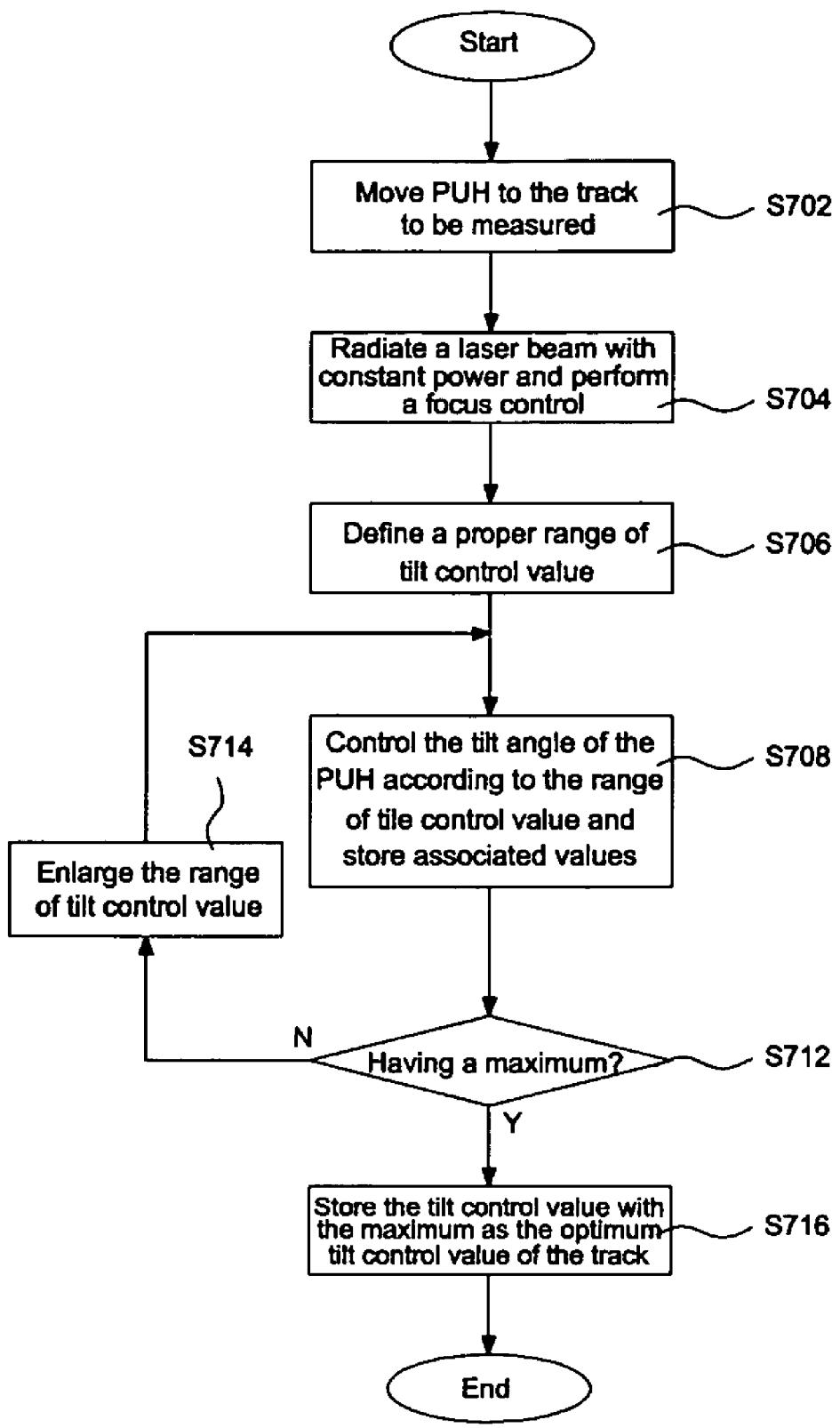
FIG. 7 shows a flow chart of the method for measuring the tilt angle of the pickup head of the invention.

FIG. 7 shows a flow chart of the method for measuring the tilt angle of the pickup head of the invention. As shown in this drawing, the method for measuring the tilt angle of the pickup head of the invention includes the following steps.

Step S702: Move the pickup head to the position of a track to be adjusted. For example, when the optical disk is just put into the optical disk drive, the pickup head may be moved to the inner track and the outer track and the tilt control value may be measured and stored, respectively.

Step S704: Radiate a laser beam with a constant power and perform a focus control. During the measuring procedure, the power of the laser beam is held constant.

Step S706: Define a proper range of tilt control value. The proper range of the tilt control value may be selected to the optimum range according to the experiences so that the measuring time may be shortened.

Step S708: Control the tilt angle of the pickup head sequentially according to the range of the tilt control value, acquire the RF signal corresponding to each tilt control value, and calculate and store the associated value of a associated signal for each tilt control value according to the RF signal. The so-called associated value may include the level of the tracking error signal, the amplitude of the W/RRF signal, the level of the S-curve signal, and the level of the RF signal. These signals are already provided by the optical disk drive units and are generated by the combination of the main beam and the sub beam. So, detailed descriptions thereof will be omitted.

Step S712: Detect the maximum among the stored associated values. If there is no maximum, the range of the tilt control value may be too small, and the process jumps to step S714. If there is a maximum, the process jumps to step S716.

Step S714: Enlarge the proper range of the tilt control value and jump back to step S708.

Step S716: Select and store the tilt control value corresponding to the maximum associated value as the optimum tilt control value for the track.

In step S708, if the associated signal is the tracking error signal, the tracking error signal amplitude is recorded. If the associated signal is the S-curve signal, amplitude of the S-curve signal is recorded, and the S-curve signal may be observed by moving the lens upwards and downwards. If the associated signal is the RFRP or W/RRF signal, the maximum peak value of the RFRP or W/RRF signal is sought. If the associated signal is the RF signal, the maximum level of the RF signal is sought.

In step S712, before detecting the maximum among the associated values, it is possible to filter the stored associated values so as to filter out the noises and thus to smooth the curve corresponding to the stored associated values. Consequently, the maximum will not be influenced by the noises.

Thus, the method for measuring the tilt angle of the pickup head of the invention can correctly measure the optimum tilt control value of the pickup head without using a displacement detector, so that the error rates of data reproducing and writing may be reduced.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method for measuring a tilt control value of a pickup head in an optical disk drive, the pickup head having an object lens, the method comprising the steps of:

moving the pickup head to a track to be measured;
radiating a laser beam with a constant power;
defining a set of tilt control values;
controlling the tilt angle of the object lens of the pickup head according to the set of tilt control values, acquiring an RF signal corresponding to each tilt control value, and storing an associated value of a associated signal for each tilt control value according to the RF signal;
detecting a maximum value among the stored associated values;
selecting the tilt control value corresponding to the maximum value as the optimum tilt control value for the track and storing the optimum tilt control value if there is a maximum value; and
modifying the set of tilt control values and executing the previous steps if there is no maximum value.

2. The method according to claim 1, further comprising the step of performing a focus control.

3. The method according to claim 1, wherein the associated signal is a tracking error signal and the associated value is the level of the tracking error signal.

4. The method according to claim 1, wherein the associated signal is a reading/writing RF signal and the associated value is the amplitude of the reproducing/writing RF signal.

5. The method according to claim 1, wherein the associated signal is a S-curve signal and the associated value is the level of the S-curve signal.

6. The method according to claim 1, wherein the associated signal is an RF signal and the associated value is the level of the RF signal.

7. The method according to claim 1, wherein the step of detecting the maximum value comprises the step of filtering the stored associated value so as to filter out noises.

* * * * *